US005456970A

United States Patent [19]

Itoh et al.

[11] Patent Number: 5,456,970

[45] Date of Patent: Oct. 10, 1995

[54] IMAGE-RECEIVING LABELING MATERIAL FOR TONER TRANSFER RECORDING

[75] Inventors: Kenichiro Itoh; Tomio Ohe, both of Osaka, Japan

[73] Assignee: Nitto Denko Corporation, Osaka, Japan

[21] Appl. No.: 228,203

[22] Filed: Apr. 15, 1994

[30] Foreign Application Priority Data

Apr. 15, 1993 [JP] Japan .................................... 5-113753

[51] Int. Cl.[6] ........................................ B32B 3/00

[52] U.S. Cl. .............................. 428/195; 428/40; 428/42; 428/43; 428/174; 428/187; 428/206; 428/403; 428/457; 428/458; 283/81

[58] Field of Search .................................... 430/527, 523; 428/195, 204, 913, 914, 323, 40, 42, 43, 174, 187, 206, 403, 457, 458; 346/135.1; 283/81

[56] References Cited

U.S. PATENT DOCUMENTS 5,126,763 6/1992 Atherton et al. ..................... 346/135.1
5,135,261 8/1992 Cusack et al. ............................ 285/81
5,310,640 5/1994 Markin et al. .......................... 430/527

OTHER PUBLICATIONS

Matsuo et al. 61–40346 Patent Abstract GRp C359, vol. 10, No. 199.
Seki et al. 60–202442, Patent Abstracts Grp. P435, vol. 10, No. 60.

*Primary Examiner*—Patrick J. Ryan
*Assistant Examiner*—William A. Krynski
*Attorney, Agent, or Firm*—Sughrue, Mion, Zinn, Macpeak & Seas

[57] ABSTRACT

An image-receiving labeling material for toner transfer recording which comprises an adhesive-backed label and a separator releasably pre-fixed thereto is disclosed, in which a substrate of the label and that of the separator both comprise a synthetic resin film, and at least the substrate of the label has an antistatic layer on the surface side thereof, the antistatic layer comprising a thermoplastic binder resin having dispersed therein fine powder of a doped metal oxide, such as P-doped $SnO_2$. The image-receiving label has a stable surface resistivity irrespective of humidity and exhibits excellent printing properties in toner transfer printing, such as toner adhesion, transferred image density, and running properties in a printing machine.

7 Claims, 2 Drawing Sheets

IMAGE-RECEIVING LABELING MATERIAL FOR TONER TRANSFER RECORDING

FIELD OF THE INVENTION

This invention relates to an adhesive-backed label which can be used as a toner image-receiving material in an electrostatic toner transfer printing machine.

BACKGROUND OF THE INVENTION

Printing machines based on electrostatic transfer of a toner include plain paper copiers (PPC), electrophotographic printers, and laser printers. In these printing systems, since paper is charged to attract a toner image, large quantities of static electricity remain on the paper after printing, causing jamming of the machine and making it difficult to put printed sheets of paper into a sheaf. It has therefore been a practice generally followed that both sides of image-receiving paper is coated with a surface active agent so as to have a surface resistivity of from about $10^{10}$ to $10^{11}$ $\Omega/cm^2$ at a humidity of 50 to 60% thereby balancing toner transfer properties and paper running properties.

However, the paper treated with a surface active agent has increased surface resistivity under a dry condition, such as a humidity of 40% or less, causing running disorders and, on the other hand, has reduced surface resistivity under a humid condition, such as a humidity exceeding 70%, causing insufficient toner transfer properties resulting in a reduction in image density.

Metal deposition is an antistatic treatment insusceptible to influences of humidity but incurs high cost for practical use. Coating of carbon black dispersed in a binder has been proposed but is unsuitable for image-receiving material due to the black color imparted.

Where a bar code is printed on an adhesive-backed paper label by a toner transfer system as has been recently increasing, if the surface resistivity is too low, toner is not transferred sufficiently, and the image is misread or cannot be read with a bar code reader or a scanner. If the surface resistivity is too high, the adhesive-backed paper label is unsuitable for recent high-speed printers due to frequent occurrence of jamming.

On the other hand, where a substrate of an adhesive-backed image-receiving label is prepared from a synthetic resin to improve water resistance or releasability, a toner has poorer adhesion than to a paper-based label, and the toner image on such a label is liable to fall off when scratched with a pen type scanner. It has therefore been demanded to develop an image-receiving labeling material excellent in toner adhesion.

SUMMARY OF THE INVENTION

An object of the present invention is to provide an adhesive-backed labeling material which has a stable surface resistivity irrespective of humidity and exhibits excellent running properties as an image receiving material in toner transfer printing.

Another object of the present invention is to provide an adhesive-backed labeling material comprising a synthetic resin which exhibits excellent toner adhesion.

As a result of extensive investigations, the present inventors have found that the above objects of the present invention are accomplished by providing an antistatic layer comprising a resin binder having dispersed therein a doped metal oxide fine powder. The present invention has been completed based on this finding.

The present invention provides an image-receiving labeling material for toner transfer recording, which comprises an adhesive-backed label and a separator which is releasably pre-fixed thereto, a substrate of the label and that of the separator both comprising a synthetic resin film, in which at least the substrate of the label has an antistatic layer on the surface side thereof, the antistatic layer comprising a binder resin having dispersed therein a doped metal oxide fine powder.

DETAILED DESCRIPTION OF THE INVENTION

Figure 1:
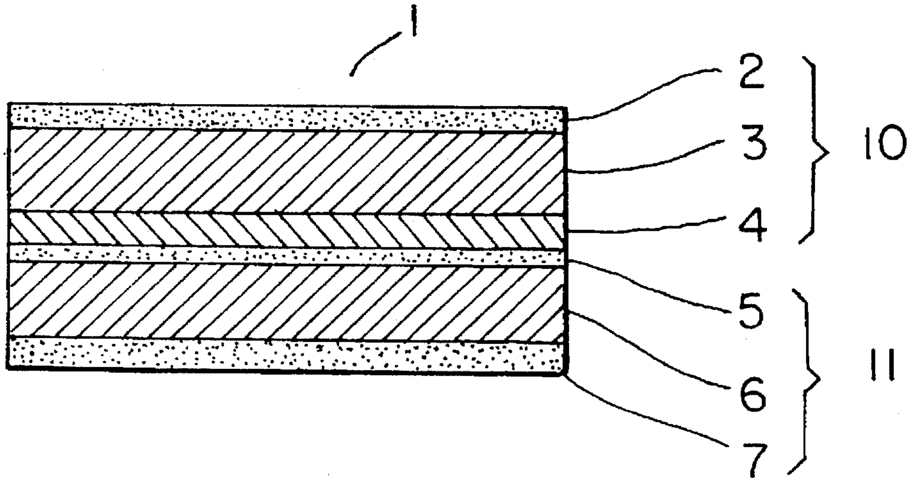
FIG. 1 is a cross section of an example of the image-receiving labeling material according to the present invention.

In FIG. 1 is shown an embodiment of the present invention, in which image-receiving labeling material 1 comprises label 10 and separator 11. Label 10 comprises substrate 3 having antistatic layer 2 on one side thereof and pressure-sensitive adhesive layer 4 on the other side. The separator 11 comprises substrate 6 having release layer 5 on the side adhering to pressure-sensitive adhesive layer 4 of label 10 and also having antistatic layer 7 on the other side.

Both substrate 3 of label 10 and substrate 6 of separator 11 are polymer films such as polyester, polyethylene, polypropylene, polystyrene or polycarbonate, which may contain compounding additives, such as fillers and softeners, or laminates of such films or expanded sheets of these polymers. While not limiting, each of these substrates preferably has a thickness of from 10 to 150 μm.

Both antistatic layers 2 and 7 comprise a thermoplastic resin layer containing a doped metal oxide fine powder, such as phosphorus- or antimony-doped tin oxide, indium oxide, titanium oxide or iron oxide. The metal oxide fine powder preferably has a particle diameter of 1 μm or less, and more preferably from 0.05 to 0.5 μm. Commercially available doped metal oxide powders may be utilized.

The thermoplastic resin which can be used as a binder of the antistatic layers includes those having excellent adhesive properties and a glass transition temperature (Tg) of from 50° to 100° C., such as polyester resins, butyral resins, and ethylene-vinyl acetate copolymer resins. Thermoplastic resins having a Tg lower than 50° C. exhibit high toner adhesion but tend to cause blocking when the image-receiving labeling materials are stored in piles. Resins having a Tg higher than 100° C. tend to have reduced toner adhesion.

Antistatic layer 2 or 7 preferably has a thickness of from 0.1 to 5.0 μm. Where a filler having a greater particle size is incorporated as hereinafter described, the thickness of the antistatic layer may be adjusted accordingly.

If desired, the antistatic layer may contain a filler, such as silica fine powder, for producing anchoring effect for a toner and thereby improving toner adhesion. The fine powder to be incorporated usually has a particle size of from 0.2 to 10 m, and preferably from 2 to 8 μm. The filler is usually used in an amount of from 0.5 to 30% by weight, and preferably from 5 to 20% by weight, on a solid basis.

If desired, the antistatic layer may also contain a fluorescent whitening agent for preventing the antistatic layer itself or the substrate from slightly yellowing. The fluorescent whitening agent is used in an amount usually of from 0.01 to 5% by weight, and preferably from 0.2 to 2.0% by weight, on a solid basis.

The antistatic layer can be formed by applying a coating composition comprising a thermoplastic resin binder having dispersed therein the above-described metal oxide fine powder to substrate 3 or 6 in a conventional manner.

Figure 2:
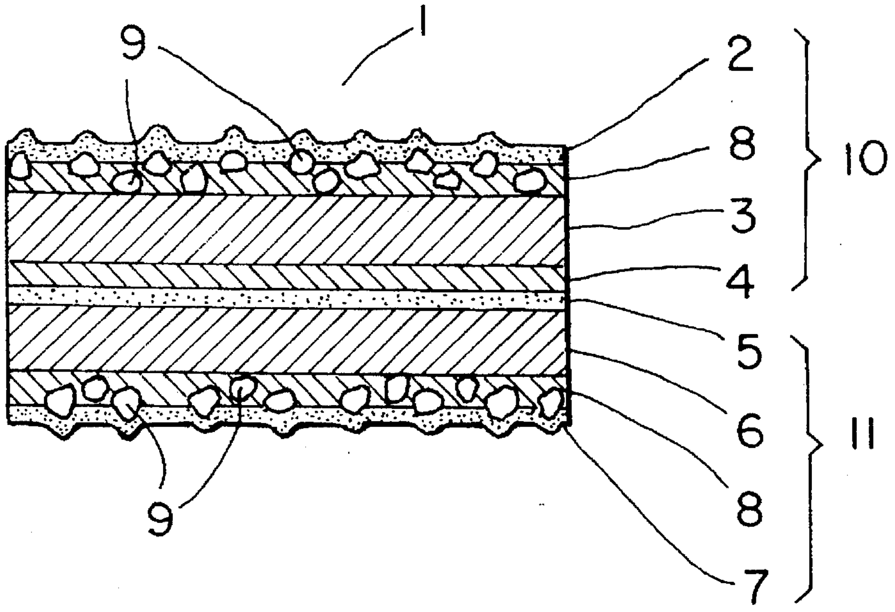
FIG. 2 is a cross section of another example of the image-receiving labeling material according to the present invention.
Figure 3:
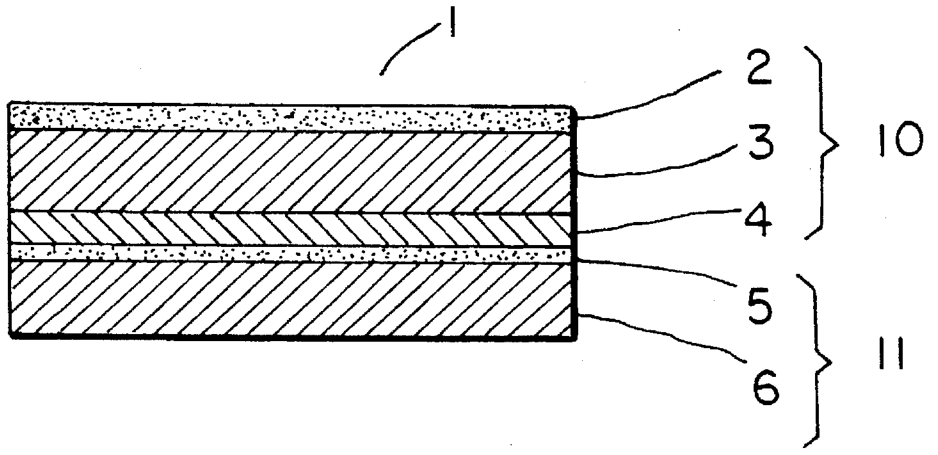
FIG. 3 is a cross-section of another example of the image-receiving labeling material of the present invention.
Figure 4:
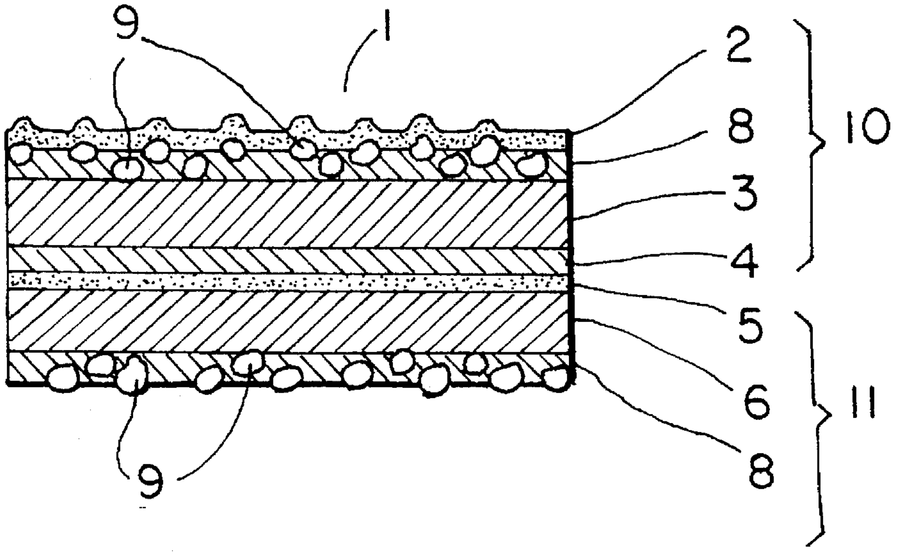
FIG. 4 is a cross-section of another example of the image-receiving labeling material of the present invention.

FIG. 2 shows a cross section of another embodiment of the present invention, in which matting layer 8 comprising a binder resin having dispersed therein filler 9, such as silica fine powder, is independently provided between substrate 3 and antistatic layer 2 and between substrate 6 and antistatic layer 7. FIGS. 3 and 4 correspond to FIGS. 1 and 2, respectively, except that there is no antistatic layer in the separator portion of the labeling material.

The surface resistivity of label 10 and separator 11 can be controlled between $10^7$ and $10^{13}$ Ω/cm$^2$ by provision of the antistatic layers. The surface resistivity of label 10 and that of separator 11 may be the same or different. Being subject to variation depending on a printing machine, the optimum surface resistivity should be selected accordingly. The surface resistivity can be adjusted by proper selection of the particle diameter of the metal oxide powder, the degree of doping of the metal oxide, and the thickness of the antistatic layer(s).

Adhesive layer 4 which is provided on the back side of the label is usually formed of general rubber-based or acrylic resin-based pressure-sensitive adhesives. The adhesive layer has a thickness usually of from 5 to 30 μm, and preferably of from 10 to 20 μm. If the adhesive layer thickness is larger than 30 μm, the adhesive applied tends to be pressed out to contaminate the inside of a printing machine.

Release layer 5 which is provided on one side of separator substrate 6 is usually formed of general ultraviolet-curing silicone resins or heat-curing silicone resins. The release layer usually has a thickness of from 0.05 to 0.5 μm.

If desired, an anchoring layer may be provided between the substrate and each of the above-described other layers. For distinction between the label side and the separator side, one or both sides of the separator may be colored.

The present invention will now be illustrated in greater detail with reference to Examples, but it should be understood that the present invention is not construed as being limited thereto. All the parts and percents are by weight unless otherwise indicated.

EXAMPLE 1

An electrically conductive coating solution A having the following formulation was applied to one side of a filler-containing white polyethylene terephthalate film having a thickness of 50 μm at a dry thickness of about 0.5 μm and dried to prepare a substrate having an antistatic layer for both a label and a separator. The binder resin of the electrically conductive coating used had a Tg of from about 60° to 70° C.

| Formulation of Solution A: | |
|---|---|
| Electrically conductive coating ("ELCOM P-3201" produced by Shokubai Kasei Kogyo K.K.; containing P-doped $SnO_2$) | 10 parts |
| Toluene | 15 parts |
| Methyl ethyl ketone | 15 parts |

The other side of the substrate for a label was coated with solution B having the following formulation to form a pressure-sensitive adhesive layer having a thickness of 10 μm.

| Formulation of Solution B: | |
|---|---|
| Acrylic resin-based pressure-sensivie adhesive | 15 parts |
| Trifunctional isocyanate compound | 0.5 part |
| Toluene | 85 parts |

The other side of the substrate for a separator was coated with solution C having the following formulation and dried to form a release layer having a thickness of about 0.1 μm.

| Formulation of Solution C: | |
|---|---|
| Silicone resin "X-62-7223A" | 0.5 part |
| Silicone resin "X-62-7223B" | 0.5 part |
| Hexane | 100 parts |

The label and the separator were joined together with the pressure-sensitive adhesive layer of the former and the release layer of the latter contacting with each other by means of a hand roller to prepare an image-receiving labeling material for toner transfer recording. The surface resistivity of both sides of the resulting labeling material was found to be $2\times10^{10}$ Ω/cm$^2$ at 22° C. and 40% RH.

EXAMPLE 2

An image-receiving labeling material for toner transfer recording was prepared in the same manner as in Example 1, except for replacing solution A with solution D having the following formulation.

| Formulation of Solution D: | |
|---|---|
| Electrically conductive coating ("ELCOM P-3201" produced by Shokubai Kasei Kogyo K.K.; containing 30% (on a solid basis) of P-doped $SnO_2$) | 10 parts |
| Toluene | 15 parts |
| Methyl ethyl ketone | 15 parts |
| Silicone resin powder ("TOSPEARL 240" produced by Toshiba Silicone Co., Ltd.) | 0.3 part |

The surface resistivity of both sides of the resulting image-receiving labeling material was found to be $5\times10^{10}$ Ω/cm$^2$ at 22° C. and 40% RH.

EXAMPLE 3

An image-receiving labeling material for toner transfer recording was prepared in the same manner as in Example 1, except for replacing solution A with solution E having the following formulation.

| Formulation of Solution E: | |
|---|---|
| Electrically conductive coating ("ELCOM P-3201" produced by Shokubai Kasei Kogyo K.K.; containing 30% (on a solid basis) of P-doped $SnO_2$) | 10 parts |
| Toluene | 15 parts |
| Methyl ethyl ketone | 15 parts |
| Fluorescent whitening agent ("KAYCOLL E" produced by Nippon Soda Co., Ltd.) | 0.015 part |

The surface resistivity of both sides of the resulting image-receiving labeling material was found to be $4\times10^{10}$ $\Omega/cm^2$ at 22° C. and 40% RH.

EXAMPLE 4

An image-receiving labeling material for toner transfer recording was prepared in the same manner as in Example 1, except that the substrate was coated with solution F having the following formulation before application of the electrically conductive coating solution.

| Formulation of Solution F: | |
|---|---|
| Silicone resin powder "TOSPEARL" | 2.5 parts |
| Polyester resin ("VYLON 200" produced by Toyobo Co., Ltd.) | 20 parts |
| Toluene | 120 parts |
| Methyl ethyl ketone | 30 parts |

The surface resistivity of both sides of the resulting image-receiving labeling material was found to be $1\times10^{11}$ $\Omega/cm^2$ at 22° C. and 40% RH.

EXAMPLE 5

An image-receiving labeling material for toner transfer recording was prepared in the same manner as in Example 1, except that solution G having the following formulation was coated in place of solution A to a dry thickness of about 0.1 μm.

| Formulation of Solution G: | |
|---|---|
| Electrically conductive coating ("ELCOM P-3001" produced by Shokubai Kasei Kogyo K.K.; containing 30% (on a solid basis) of Sb-doped $SnO_2$) | 10 parts |
| Toluene | 45 parts |
| Methyl ethyl ketone | 45 parts |

The surface resistivity of both sides of the resulting image-receiving labeling material was found to be $1\times10^{10}$ $\Omega/cm^2$ at 22° C. and 40% RH.

Comparative Example 1

An image-receiving labeling material for toner transfer recording was prepared in the same manner as in Example 1, except for replacing solution A with solution H having the following formulation.

| Formulation of Solution H: | |
|---|---|
| Surface active agent ("Electrostripper AC" produced by Kao Corp.) | 4 parts |
| Isopropyl alcohol | 100 parts |

The surface resistivity of both sides of the resulting image-receiving label was found to be $1\times10^{12}$ $\Omega/cm^2$ at 22° C. and 40% RH but reduced to $8\times10^{9}$ $\Omega/cm^2$ as determined at 22° C. and 80% RH.

Comparative Example 2

An image-receiving labeling material for toner transfer recording was prepared in the same manner as in Example 1, except for replacing solution A with solution I having the following formulation.

| Formulation of Solution I: | |
|---|---|
| Electrically conductive coating (UV-curing coating "ELCOM P-3555" produced by Shokubai Kasei Kogyo K.K.) | 10 parts |
| Ethyl cellosolve | 30 parts |

The surface resistivity of both sides of the resulting image-receiving label was found to be $5\times10^{10}$ $\Omega/cm^2$ at 22° C. and 40% RH. The surface resistivity reduced under a high humidity condition to give a reduced image density as demonstrated in a printing test hereinafter described.

Each of the image-receiving labeling materials obtained in the above-described Examples and Comparative Examples was evaluated according to the following test methods. The results obtained are shown in the Table below.

1) Toner Adhesion:

A black solid image was printed on the label side of the labeling material using a toner transfer copying machine ("Type 5055" manufactured by Fuji Xerox Co., Ltd.) at 20° C. and 52% RH. A pressure-sensitive adhesive tape ("31B" produced by Nitto Denko Corporation) was adhered on the transferred toner image and, after 30 minutes, stripped at a peel angle of 90° and a pulling speed of about 1 m/min. The toner adhesion was evaluated from the proportion of the toner remaining on the label.

2) Image Density:

A black solid image was printed on the label side of the labeling material using a toner transfer printer ("801PS" manufactured by Oki Electric Industry Co., Ltd.) at 20° C. and 73% RH. An image density of the transferred toner image was measured with a Macbeth densitometer "RD-920".

TABLE

| Example No. | Toner Adhesion | Judgement of Toner Adhesion | Image Density | Color of Label |
|---|---|---|---|---|
| Example 1 | slightly peeled | good | 1.38 | slightly yellow-tinted |

TABLE-continued

| Example No. | Toner Adhesion | Judgement of Toner Adhesion | Image Density | Color of Label |
|---|---|---|---|---|
| Example 2 | scarcely peeled | excellent | 1.33 | slightly yellow-tinted |
| Example 3 | slightly peeled | good | 1.35 | excellent in whiteness |
| Example 4 | scarcely peeled | excellent | 1.38 | slightly yellow-tinted |
| Example 5 | slightly peeled | good | 1.20 | slightly gray-tinted |
| Comparative Example 1 | almost peeled | poor | 0.98 | slightly yellow-tinted |
| Comparative Example 2 | almost peeled | poor | 1.33 | slightly gray-tinted |

The image-receiving labeling material according to the present invention has an antistatic layer comprising a thermoplastic binder resin having dispersed therein a phosphorus- or antimony-doped metal oxide powder on both sides thereof. As described and demonstrated above, the image-receiving labeling material having such a structure exhibits excellent printability in toner transfer printing in terms of toner adhesion and toner transfer properties. The image-receiving labeling material of the present invention can easily be endowed with excellent whiteness by addition of a fluorescent whitening agent.

While the invention has been described in detail and with reference to specific examples thereof, it will be apparent to one skilled in the art that various changes and modifications can be made therein without departing from the spirit and scope thereof.

What is claimed is:

1. An image-receiving labeling material for toner transfer recording which comprises an adhesive-backed label and a separator which is releasably pre-fixed, a substrate of the label and that of the separator both comprising a synthetic resin film, in which the substrate of the label and the substrate of the separator each has an antistatic layer on one side thereof, the antistatic layer comprising a binder resin having dispersed therein fine powder of a doped metal oxide.

2. An image-receiving labeling material for toner transfer recording as claimed in claim 1, wherein said metal oxide is at least one of tin oxide, indium oxide, titanium oxide, and iron oxide.

3. An image-receiving labeling material for toner transfer recording as claimed in claim 2, wherein said metal oxide is doped with phosphorus or antimony.

4. An image-receiving labeling material for toner transfer recording as claimed in claim 1, wherein said antistatic layer contains particles having a particle diameter of from 0.5 to 10 μm.

5. An image-receiving labeling material for toner transfer recording as claimed in claim 1, wherein said antistatic layer contains a fluorescent whitening agent.

6. An image-receiving labeling material for toner transfer recording as claimed in claim 1, wherein said binder resin in said antistatic layer is a thermoplastic resin having a glass transition temperature of from 50° to 100° C.

7. An image-receiving labeling material for toner transfer recording as claimed in claim 1, wherein a matting layer containing particles having a particle diameter of from 0.5 to 10 μm is provided between the substrate of said label and an antistatic layer provided thereon and/or between the substrate of said separator and said antistatic layer provided thereon.

* * * * *